Dec. 13, 1949  G. A. BERGHAMMER, JR  2,491,078
FISH BONING MACHINE
Filed Oct. 26, 1946                2 Sheets-Sheet 1
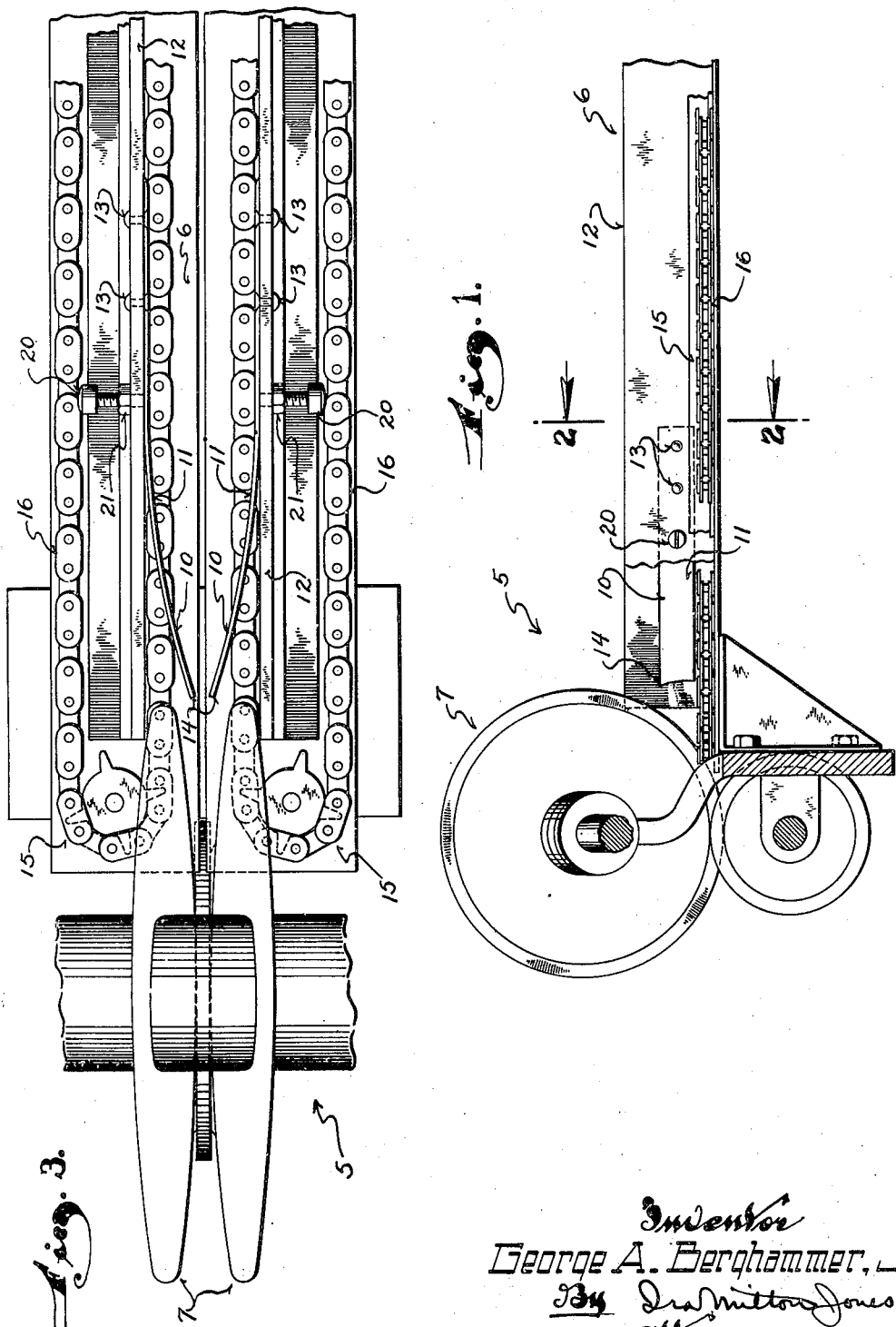
Inventor
George A. Berghammer, Jr.
By Ira Milton Jones
Attorney

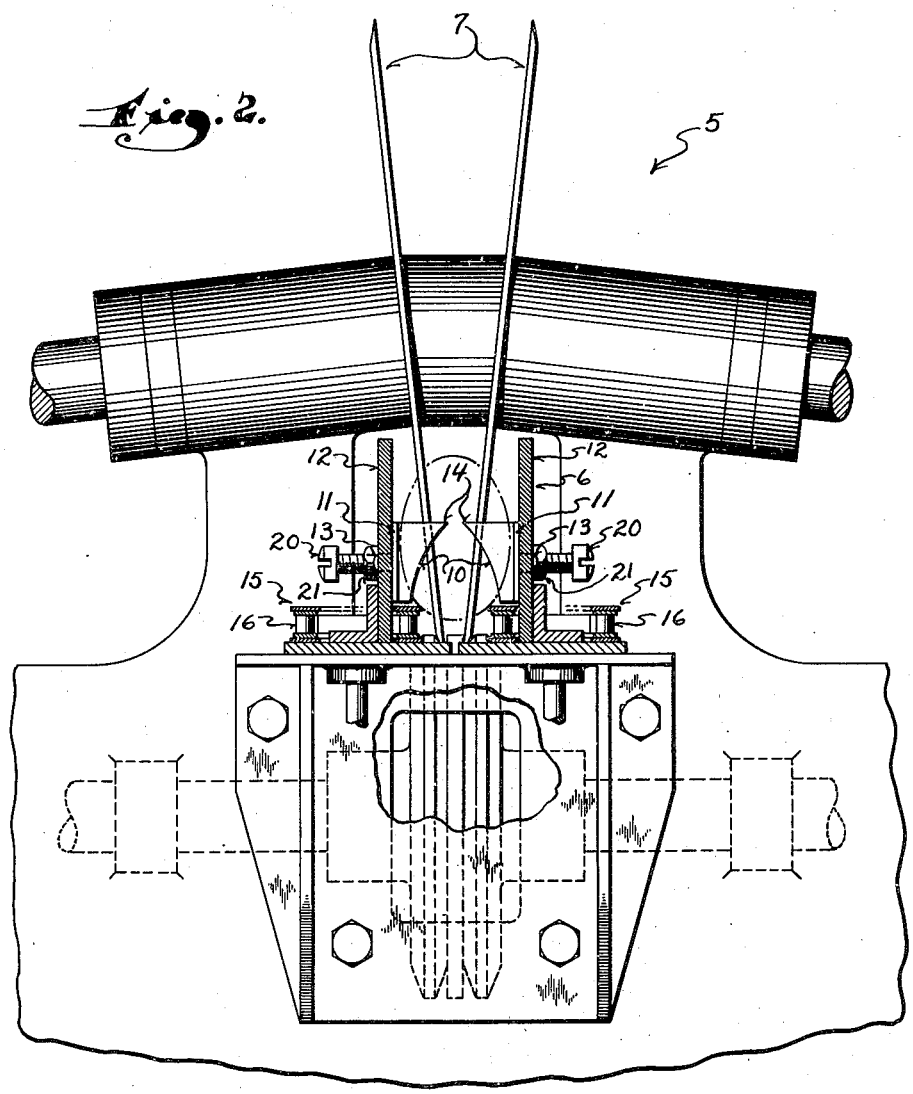

Patented Dec. 13, 1949

2,491,078

UNITED STATES PATENT OFFICE 2,491,078

FISH BONING MACHINE

George A. Berghammer, Jr., Milwaukee, Wis., assignor to Griffin's Associated Fisheries, Inc., Milwaukee, Wis., a corporation of Wisconsin Application October 26, 1946, Serial No. 705,962

1 Claim. (Cl. 17—4)

This invention relates to improvements in fish boning machines and has as its general object to provide for efficient removal of the bones and entrails of fish with a minimum amount of waste.

In fish boning machines of the type to which this invention pertains fish having had their heads and tails cut off in a previous operation are fed lengthwise along a defined path and belly uppermost into the converging peripheral portions of a pair of rotating disc knives to have a V-shaped section including the bones and entrails of the fish cut therefrom by passage through the knives. The removal of this center section as waste leaves the opposite sides of the fish as boneless fillets which are much desired.

The accuracy with which the center sections of the fish are removed to completely eliminate the bones and entrails of the fish depends entirely upon passage of the fish through the blades with the fish in a predetermined positional relationship with respect to the knives. For example, if the fish are tilted laterally out of an exactly upright position to one side or the other as they enter the knives, not only is removal of the bones and entrails imperfect but much of the desired flesh is cut away and wasted. As everyone knows, fillets having a large percentage of bones or some of the entrails adhering thereto are practically valueless.

In order to compensate for slight variations in the angle of presentation of fish to the cutting knives, it is common practice to set the knives at such a convergent angle that removal of the bones and entrails is assured despite some lateral tilting of the fish with respect to the knives. While assurance of the removal of substantially all of the bones and entrails is attained by this expedient, it is obvious that considerable waste of valuable flesh results from this practice.

It is an object of this invention, therefore, to provide a boning machine of the character described in which the fish are guided for travel into the revolving knives at a predetermined angle relative to the knives to enable the V-shaped section cut from the fish to be of minimum width to avoid waste but at the same time insure complete removal of all the bones and entrails of the fish.

Another object of this invention resides in the provision of resilient guide fingers positioned for engagement with the opposite sides of the fish traveling into the knives of the machine to hold the fish centered with respect to the knives despite the varying thickness of fish fed into the knives.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in acordance with the best mode so far devised for the practical application of the principles thereof, and in which:

Figure 1 is a side elevational view of a portion of a fish boning machine illustrating the application of this invention thereto;

Figure 2 is a cross sectional view taken on the plane of the line 2—2 of Figure 1; and Figure 3 is a plan view of the portion of the machine illustrated in Figure 1.

Referring now more particularly to the accompanying drawings in which like numerals indicate like parts, the numeral 5 generally designates a fish boning machine only a portion of which is shown. The machine 5 may be of any known type in which fish, having had their heads and tails removed in a previous operation, are deposited in a trough 6 and conducted lengthwise and belly uppermost toward and past the customary pair of substantially upright revolving disc knives 7 set at an angle to one another with their lower peripheries closely adjacent and contiguous so that the cutting edges of the knives define a V.

The fish thus conducted along the trough 6 pass through the knives at the lower periphery thereof to have a V-shaped longitudinal section cut from their middle portions and in which are located the bones and entrails of the fish.

It will be observed, therefore, that the angle at which the knives are disposed determines the width of the V-shaped section cut from the fish, while the efficiency of bone and entrail removal depends upon the fish passing into the knives at a predetermined angle of presentation with respect thereto so that the knives embrace and pass closely adjacent to the bone system of the fish. With the proper angle of presentation of the fish to the knives and a "close" setting of the knives, the entrails and bones are cut from the fish and the same are divided into boneless fillets with no unnecessary waste.

Consequently, great care should be taken in setting the knives at a proper angle which will insure thorough boning and removal of the entrails of the fish entering the knives without waste.

In the past, however, it has been general practice to set the knives at an angle of such magnitude as to assure removal of the bones and entrails of the fish traveling therethrough to compensate for fish entering the knives at slight angles of tilt from a vertical position centered with respect to the knives. This is necessary in view of the fact that the sides of the trough along which the fish are conducted to the knives are incapable of holding all of the fish exactly upright, for the trough must be wide enough to accommodate the largest of any batch of fish being boned and thus permits tilting of the smaller fish being handled.

It is readily seen that this past practice results in considerable unnecessary waste as a certain proportion of the desirable flesh of the fish is invariably cut away to be discarded along with the center section containing the bones and entrails.

The present invention overcomes this objection to past fish boning machines by the provision of a pair of opposite resilient centering arms 10 inside the trough and at the end of the trough adjacent the knives for engagement with the opposite sides of the fish to hold the same upright against tilting and centered with respect to the knives.

These arms are provided by substantially flat spring fingers 11 disposed lengthwise within the trough flatwise with respect to the side walls 12 of the trough. The end portions of the arms remote from the knives are riveted or otherwise secured to the upright side walls 12 of the trough as at 13.

The spring arms extend forwardly from their fixed ends and converge inwardly toward each other in the direction of travel of the fish toward the knives 7 to have their yieldable free end portions 14 disposed centrally of the trough and adjacent to each other and to the lower peripheries of the knives.

The fish are conducted along the trough by means of the usual conveyer mechanism 15, in the present instance shown as a pair of endless chains 16 each embracing one side wall of the trough to have their inner adjacent stretches disposed inside the trough and forming a movable bottom therefor. The backs of the fish rest on these inner stretches of the conveyer chains so that the fish are conducted belly uppermost and lengthwise toward the knives.

As the fish are about to enter the knives, the opposite sides of the fish are engaged by the inner flat sides of the spring arms 11 which exert a yielding pressure on the fish to hold the same in a vertical position and exactly centered with respect to the revolving disc knives 7. Consequently, the fish are caused to enter the knives at the proper angle of presentation despite variation in their thickness to assure accurate and efficient removal of the center section of the fish containing the bones and entrails so as to produce boneless fillets of substantially maximum size.

It is to be observed that the resilient free end portions of the spring arms yield and spread apart upon passage of the thickest portions of a fish therethrough but that the arms move toward one another and remain in contact with the opposite sides of the fish as the thickness thereof decreases toward the tail end of the fish passing therethrough.

Hence, the spring arms exert their guiding action on the fish for substantially the entire length of the fish to insure against tilting of the fish during its passage through the knives.

In order that the fish be held exactly vertical and centered with respect to the knives during their passage between the spring arms 11, it will be appreciated that the arms must exert substantially the same pressure on the opposite sides of the fish. The pressure with which the arms engage the fish may be adjusted to bring about a balanced action of the arms by means of adjusting screws 20 threaded into the opposite upright sides 12 of the trough to have their inner ends engage against the spring arms between their free and fixed ends.

The adjusting screws are preferably located closer to the fixed ends of the spring arms so as not to interfere to any great extent with the resilient and yieldable characteristics of the free end portions of the arms.

Lock nuts 21 threaded onto the adjusting screws 20 and bearing against the outer surfaces of the upright side walls 12 of the trough enable the adjusting screws to be securely held in any position of adjustment. The adjustment provided for the spring arms 11 is especially desirable from the standpoint that it enables runs of fish of various sizes to be accommodated without the necessity for adjusting the spacing of the upright side walls 12 of the trough.

From this it will be seen that the fish passing along the trough in a tilted condition are straightened to a vertical position and centered by the spring arms just prior to their entry into the knives.

From the foregoing description taken in connection with the accompanying drawings, it will be readily apparent to those skilled in the art that this invention assures the accurate and efficient cutting of fillets with a minimum amount of waste despite normal variation in the thickness of the fish being cut.

What I claim as my invention is:

In a fish boning machine of the type having a pair of revolving disc knives set at an angle to one another with their lowermost peripheries converging and contiguous so that the planes of the knives substantially define a V; means for conducting fish lengthwise and belly uppermost into the lower converging portions of the knives to have a V-shaped longitudinal section including the bones and entrails cut from the fish during their passage through the knives, said means including a pair of substantially upright side walls fixed with relation to the machine in spaced apart substantially parallel relationship to one another, and a conveyor having a stretch constrained to travel lengthwise between said side walls and cooperating therewith to define an open topped trough having a movable bottom upon which the backs of fish rest and by which the fish are conducted belly uppermost between said side walls toward and into the knives; and a pair of opposite elongated relatively flat spring blades in said trough disposed lengthwise of the trough adjacent to the knives and between which the fish are conducted in their travel toward the knives, each of said blades having its end portion remote from the knives anchored flatwise to one of said side walls, and having the extremity of its opposite end portion disposed closely adjacent to said knives, said opposite end portions of the blades converging toward one another to normally have their extremities closely adjacent to each other and to the center of the trough, and said opposite end portion of each blade being free to flex toward its side wall by the passage of a fish between the blades with such flexure building up tension in the blades to cause them to yieldingly resist spreading, whereby the free end portions of the blades yieldingly react against the sides of fish passing between them and entering the knives to hold the fish centered at such an angle with respect to the knives as to assure accurate removal of the bones and entrails from the fish with a minimum amount of waste.

GEORGE A. BERGHAMMER, Jr.

REFERENCES CITED

The following references are of record in the file of this patent:

UNITED STATES PATENTS

| Number | Name | Date |
| --- | --- | --- |
| 346,871 | Shute et al. | Aug. 3, 1886 |
| 1,639,976 | Barry | Aug. 23, 1927 |
| 1,885,829 | Hunt | Nov. 1, 1932 |
| 2,110,416 | David et al. | Mar. 8, 1938 |
| 2,140,575 | David et al. | Dec. 20, 1938 |